United States Patent [19]

Arikawa

[11] Patent Number: 4,834,466
[45] Date of Patent: May 30, 1989

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Japan

[21] Appl. No.: 120,925

[22] Filed: Nov. 16, 1987

[30] Foreign Application Priority Data

Nov. 19, 1986 [JP] Japan .................... 61-276209

[51] Int. Cl.⁴ ............................................ B60T 8/88
[52] U.S. Cl. ................................. 303/92; 303/111
[58] Field of Search .................. 188/181 A, 181 C; 303/6 C, 6 R, 92, 100, 109, 110, 111, 115, 116, 119

[56] References Cited

U.S. PATENT DOCUMENTS

| | | | |
|---|---|---|---|
| 3,674,317 | 7/1972 | Mangold . | |
| 3,907,377 | 9/1975 | Mayer . | |
| 3,980,346 | 9/1976 | Leiber | 303/6 R |
| 4,229,049 | 10/1980 | Ando | 303/6 C |
| 4,418,966 | 12/1983 | Hattwig | 303/100 |
| 4,421,362 | 12/1983 | Shirai et al. | 303/115 |
| 4,451,096 | 5/1984 | Gygax | 303/109 |
| 4,547,022 | 10/1985 | Brearley et al. | 303/6 C |
| 4,637,664 | 1/1987 | Arikawa | 303/111 |
| 4,648,662 | 3/1987 | Fennel et al. | 303/92 |

*Primary Examiner*—Duane A. Reger
*Attorney, Agent, or Firm*—Jones, Day, Reavis & Pogue

[57] ABSTRACT

In an anti-skid control apparatus which includes two independent conduit systems having diagonally connected brake conduits for a pair of front wheels and a pair of rear wheels, fluid pressure control valve devices are arranged in the respective brake conduits and a valve apparatus for generating a fluid pressure in accordance with the lower one of the brake fluid pressures of the front wheels is controlled by the fluid pressure control valve device. The valve apparatus is disposed between the wheel cylinders of the front wheels and those of the rear wheels. The one fluid pressure control valve device for the one front wheel running on the low side is normally controlled by conbining logically the signals indicating the skid conditions of the rear wheels with the signals indicating the skid conditions of the one front wheel on the low side. If the valve apparatus fails, it is made to be controlled by combining logically the signals indicating the skid condition of the one rear wheel on the high side with those of the one front wheel on the low side.

4 Claims, 6 Drawing Sheets

ANTI-SKID CONTROL APPARATUS FOR A VEHICLE BRAKING SYSTEM

BACKGROUND OF THE INVENTION

1. Field of the Invention

This invention relates to an anti-skid control apparatus for a vehicle braking system which can prevent locking of the wheels.

2. Description of the Prior Art

An anti-skid control apparatus for a vehicle braking system is known that includes a fluid pressure control valve device arranged between a master cylinder and a wheel cylinder of a brake for the wheel, the fluid pressure control valve device receiving control signals from a control unit measuring the skid condition of the wheel to control the brake fluid pressure to the wheel cylinder.

When a fluid pressure control valve device is provided for each of four wheels, and the fluid pressures to the wheels are independently controlled, there is no problem of control operation. When a fluid pressure control valve device is provided for each of the front wheels, and for both of the rear wheels in common, there is no problem in controlling braking. In the latter case, the one common fluid pressure control valve device is controlled on the basis of the lower one of the speeds of the rear wheels.

However, in the above cases, three or four fluid pressure control valve devices are used. Accordingly, the whole anti-skid control apparatus is large in size and very heavy. Siince the fluid pressure control valve device is expensive, the cost is relatively high.

For example, suppose the brake fluid pressures of the front wheels are controlled by the fluid pressure control valve devices respectively in a diagonal or X-type conduit system, and the brake fluid pressures of the rear wheels are controlled in common with the front wheels. When the vehicle runs on the road in which the right and left sides of which have considerably different coefficients of friction, the one rear wheel located diagonally to the one front wheel on the higher frictional coefficient side is locked. In that case, the steering of the vehicle becomes unstable, a condition that is very dangerous.

Further, even if proportioning valves are provided for the rear wheels, the brake fluid pressure of the rear wheels increase in proportion of the input fluid pressures to the proportioning valves. There is still a danger of locking.

Accordingly, in order to provide an anti-skid control apparatus for a vehicle braking system which can be small-sized and light, and can minimize the possibility of locking of rear wheels, this applicant previously proposed an anti-skid control apparatus for a vehicle braking system which includes a fluid pressure control valve device arranged between a master cylinder and a wheel cylinder of a brake for the wheel and receiving control signals from a control unit measuring the skid condition of the wheel to control the brake fluid pressure to the wheel cylinder a fluid pressure control valve device was also provided for a pair of front wheels, consisting of a valve apparatus receiving fluid pressures from wheel cylinders of the front wheels. The valve apparatus was located between the pair of front wheels and a pair of rear wheels, and when any one of the fluid pressure control valve devices starts to control, the fluid pressure of the one of said rear wheels at the same side as the one front wheels in which the fluid pressure of the wheel cylinder of which is lower is controlled in accordance with the lower one of the fluid pressures of the wheel cylinders of the front wheels by the valve apparatus.

In the above-described anti-skid control apparatus, the control signals from the control units are formed by judging the skid conditions of the respective front wheels. On the assumption that the front and rear wheels are provided with tires of the same kind, the braking forces are so distributed to the wheels that the front wheels tend to lock sooner than the rear wheels, when the vehicle is rapidly braked on a road which is uniform in frictional coefficient.

However, when the above assumption is not fulfilled, for example, when only the front wheels are provided with spiked tires or chains for running on snow or ice, and rear wheels are provided with the normal tires, the rear wheels tend to lock sooner than the front wheels. In the above anti-skid control apparatus, the brake fluid pressure is not controlled with the locking of the rear wheel. When the brake fluid pressure of the front wheel is controlled over the limit locking pressure of the rear wheel, the rear wheel status locked, and the steering is unstable.

Even when the front and rear wheels are provided with similar tires, the rear wheel may tend to lock sooner than the front wheel, when the frictional coefficient of the brake lining becomes excessively low due to thermal fade in a front wheel brake apparatus and the limit lock pressure of the front wheel becomes excessively high, and particularly when the vehicle is rapidly braked on a road having a relatively high coefficient of friction. When a proportioning valve is used, the fluid pressure of the rear wheel is lower than that of the front wheel. However, this pressure increases in proportion to the fluid pressure of the front wheel, and may reach the limit lock pressure, causing steering instability.

Further, in order to provide an anti-skid control apparatus for a vehicle braking system which can be small-sized and light, and can minimize the danger of locking of rear wheels in any case, this applicant previously proposed an anti-skid control apparatus for a vehicle braking system with a pair of front wheels, and a pair of rear wheels. Wheel speed sensors were associated with the wheels, respectively. A first fluid pressure control valve device for controlling the brake fluid pressure of the wheel cylinder of one of said front wheels was arranged between a first fluid pressure generating chamber of a tandem master cylinder and the wheel cylinder of the one front wheel. A second fluid pressure control valve device for controlling the brake fluid pressure of the wheel cylinder of another of said front wheels was arranged between a second fluid pressure generating chamber of the tandem master cylinder and the wheel cylinder of the other front wheel. A control unit received outputs of the wheel speed sensors for measuring or judging the skid conditions of the front and rear wheels and for generating instructions for controlling the first and second fluid pressure control valve devices. A valve apparatus for generating a fluid pressure in accordance with the lower one of the brake fluid pressures of said front wheels controlled with said first and second fluid pressure control valve devices was arranged between the wheel cylinders of the front wheels and those of the rear wheels control unit discriminated between the frictionally lower one (designated as "low side") of the sides of the road on which the wheels are running on the basis of the measuring or judging results of the skid conditions of the rear wheels. It combined logically the measuring or judging results of the skid conditions of the rear wheels with the measuring or judging result of the skid condition of the one front wheel running on the low side to generate on instruction for controlling the first or second fluid pressure control valve device. It also generated an instruction for controlling the second or first fluid pressure control valve device, on the basis of the measuring or judging result of the skid condition of the other front wheel running on the high side (frictionally higher side) independently of those of the rear wheels.

In the above arrangement, when the valve apparatus operates normally, there is no problem. However, if the valve apparatus fails, the front and rear wheels remain connected in a diagonal relationship. Under a certain condition, one of the rear wheels locks, and the one front wheel on the same side as the locked rear wheel and the other rear wheel are subject to extreme "under braking" which means insufficient braking force.

SUMMARY OF THE INVENTION

Accordingly, it is an object of this invention to provide an anti-skid control apparatus for a vehicle braking system by which the necessary braking force can be obtained even when a valve apparatus fails.

In accordance with an aspect of this invention, in an anti-skid control apparatus for a vehicle braking system including a pair of front wheels, and a pair of rear wheels, and wheel speed sensors associated with said wheels; a first fluid pressure control valve device for controlling the brake fluid pressure of the wheel cylinder of one of said front wheels is arranged between a first fluid pressure generating chamber of a tandem master cylinder and the wheel cylinder of the one front wheel. A second fluid pressure control valve device for controlling the brake fluid pressure of the wheel cylinder of another of the front wheels is arranged between a second fluid pressure generating chamber of the tandem master cylinder and the wheel cylinder of the other front wheel. A control unit receives outputs of the wheel speed sensors for measuring or judging the skid conditions of the front and rear wheels and for generating instructions to control the first and second fluid pressure control valve devices. A valve apparatus for generating a fluid pressure in accordance with the lower one of the brake fluid pressures of the front wheels controlled with the first and second fluid pressure control valve devices is arranged between the wheel cylinders of the front wheels and those of the rear wheels; so that the control unit determines the frictionally lower one (designated as "low side") of the sides of the road on which the wheels are running, on the basis of the measured results of the skid conditions of the rear wheels and/or front wheels, and combines logically the measured results of the skid conditions of the rear wheels with the measured result of the skid condition of the one front wheel running on the low side to generate a instruction for controlling the first or second fluid pressure control valve device. The control unit also generates an instruction for controlling the second or first fluid pressure control valve device, on the basis of the measured result of the skid condition of the other front wheel running on the high side (frictionally higher side) independently of those of the rear wheels. When failure of the valve apparatus is detected, the control unit combines logically the measured result of the skid condition of the one rear wheel on the high side with the measured result of the skid condition of the one front wheel on the low side to generate an instruction for controlling the first or second fluid pressure control valve device for the one front wheel.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
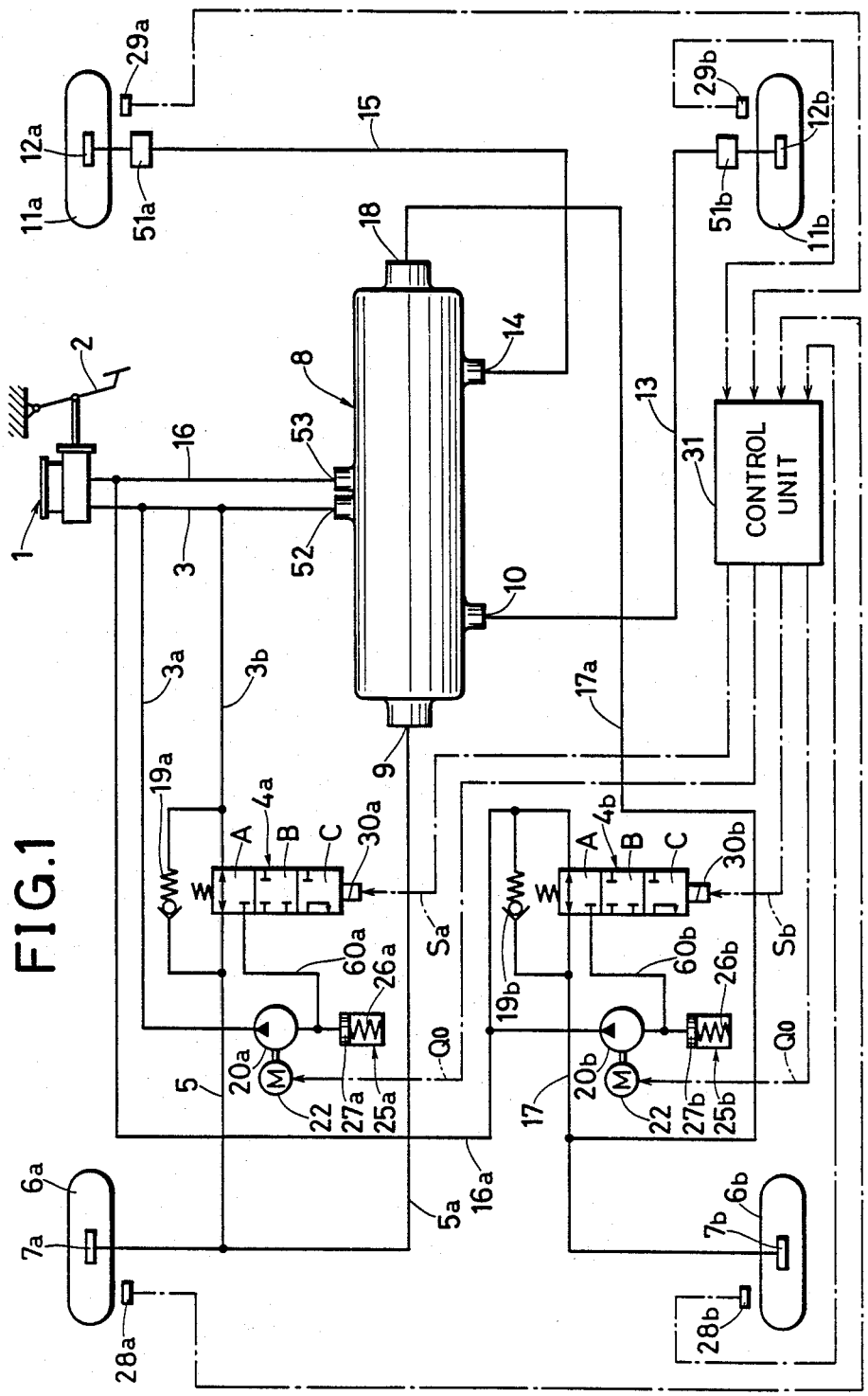
FIG. 1 is a schematic view of an anti-skid control apparatus according to an embodiment of this invention.

In FIG. 1, a brake pedal 2 is connected to a tandem master cylinder 1. One fluid pressure chamber of the tandem master cylinder 1 is connected to a wheel cylinder 7a of a right front wheel 6a through a conduit 3, an electromagnetic three-position valve device 4a and a conduit 5. The conduit 5 is further connected to a first input port 9 of a valve apparatus 8 to be hereinafter described below in detail. The first input port 9 normally communicates with a first output port 10 in the valve apparatus 8. The first output port 10 is connected to a wheel cylinder 12b of a left rear wheel 11b through a conduit 13 and a proportioning valve 51b.

Another fluid pressure chamber of the tandem master cylinder 1 is connected to a wheel cylinder 7b of a left front wheel 6b through a conduit 16a, an electromagnetic three-position valve device 4b and a conduit 17. The conduit 17a is further connected to a second input port 18 of the valve apparatus 8. The second input port 18 normally communicates with a second output port 14 in the valve apparatus 8. The second output port 14 is connected to a wheel cylinder 12a of a right rear wheel 11a through a conduit 15 and a proportioning valve 51a.

Discharge openings of the valve devices 4a and 4b are connected through conduits 60a and 60b to hydraulic reservoirs 25a and 25b, respectively. The hydraulic reservoirs 25a and 25b include pistons 27a and 27b fitted to side in a casing and relatively weak springs 26a and 26b. Reserving chambers of a reservoirs 25a and 25b are connected to suction openings of fluid pressure pumps 20a and 20b.

Although the fluid pressure pumps 20a and 20b are shown, each of them consists of a pair of casings, pistons fitted to slide into the casing, an electric motor 22 reciprocating the piston, and check valves. Supply openings of the fluid pressure pump 20a and 20b are connected to the conduits 3a and 16a. Although two electric motors 22 are shown, this is only one. The electric motor 22 is used in common with the fluid pressure pumps 20a, 20b.

Wheel speed sensors 28;i a, 28b, 29a, and 29b are associated with the wheels 6a, 6b, 11a and 11b respectively to generate pulse signals having frequencies proportional to the rotational speeds of the wheels 6a, 6b, 11a and 11b. The pulse signals of the wheel speed sensors are supplied to a control unit 31.

The control unit 31 consists of a judge part 31A and a logic part 31B. Control signals Sa and Sb and a motor drive signal Qo are generated from the control unit 31, and the control signals Sa and Sb are supplied to solenoid portions 30a and 30b of the valve devices 4a and 4b. Dashed lines represent electric lead wires.

The electromagnetic valves devices are shown schematically because their construction's 4a and 4b have well-known. When the control signals Sa and Sb are "0", the valve devices 4a and 4b take positions A for increasing the brake pressure to the brake for the wheel. In the first position A, the master cylinder side and the wheel cylinder side are connected with each other. When the control signals Sa and Sb are "½", the valve devices 4a and 4b take second positions B maintain the brake pressure to the brake constant. In the second position B, the connections between the master cylinder side and the wheel cylinder side, and between the wheel cylinder side and the reservoir side are interrupted. When the control signals Sa and Sb are "1", the valve devices 4a and 4b take third positions C to decrease the brake pressure to the brake. In the third position C, the communication between the master cylinder side and the wheel cylinder side is interrupted, while the wheel cylinder side and the reservoir side are connected. The brake fluid is discharged through the conduit 60a and 60b into the reservoir 25a and 25b from the wheel cylinders 7a, 7b and 12a and 12b.

When any one of the control signals Sa and Sb becomes initially "1", the motor drive signal Qo is generated, and it is kept during the skid control operation. The drive signal Qo is supplied to the motor 22.

Figure 2:
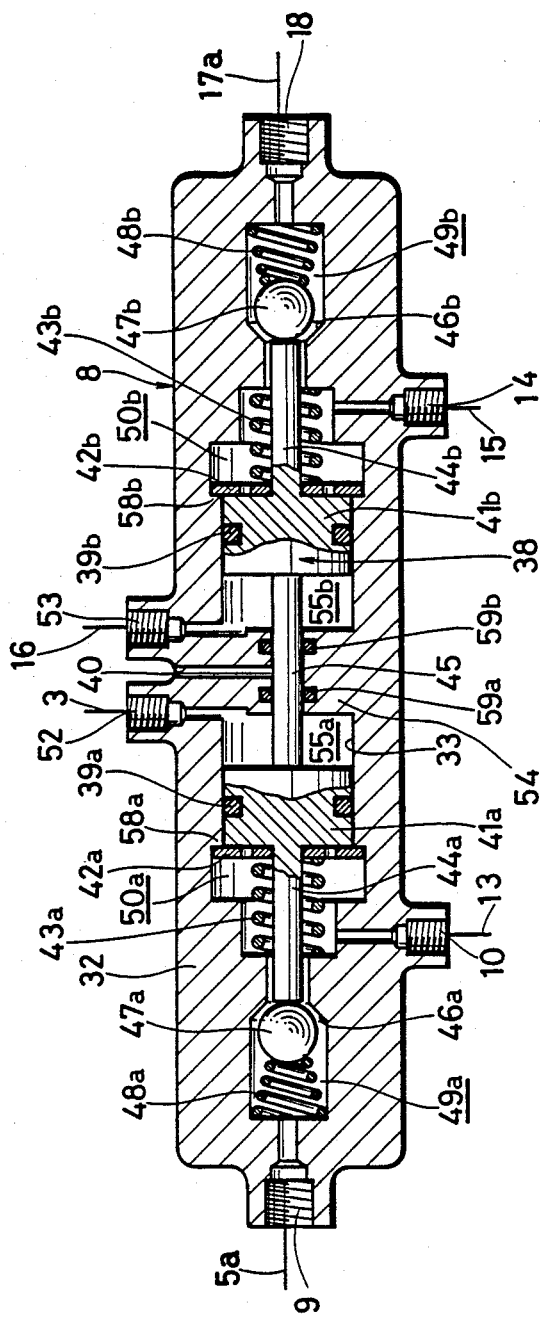
FIG. 2 is an enlarged cross-sectional view of a valve apparatus in FIG. 1.

Next, the details of the valve apparatus 8, to which the brake fluid pressures are applied from the wheel cylinders 7a and 7b of the front wheels 6a and 6b, will be described with reference to FIG. 2.

A stepped through-hole 33 is axially formed in a casing 32 for the valve apparatus 8. The above-described first and second input ports 9 and 18 are formed in the left and right openings, respectively.

A stepped piston 38 provided with seal rings 39a and 39b is fitted to slide to a central position of the stepped hole 33. The stepped piston 38 is symmetrical, and it consists of a pair of large-diameter portions 41a and 41b, a pair of rod portions 44a and 44b and a small-diameter portion 45 connecting the larger-diameter portions 41a and 41b. The small-diameter portion 45 is fitted into a central hole of a partition 54 of the casing 32 and sealed with seal rings 59a and 59b. The large-diameter portions 41a, 41b are fitted into the right and left large-diameter holes of the stepped through-hole 33 and sealed with seal rings 39a, 39b.

Spring-receiving rings 42a and 42b are fitted to the rod portions 44a and 44b, and they receive springs 43a and 43b. The stepped piston 38 is urged to the center of the stepped hole 33 by the springs 43a and 43b, and so it is normally put at a neutral position as shown in FIG. 2. The spring-receiving rings 42a l and 42b are normally in contact with stepped portions 58a and 58b formed in the inner wall of the casing 32. The inside positions of the rings 42a and 42b are determined by them.

Normally, the rod positions 44a and 44b of the piston 38 are in contact with valve balls 47a and 47b which are positioned in input chambers 49a and 49b, and are urged inwards by springs 48a and 48b. In the condition shown, the valve balls 47a and 47b are separated from valve seats 46a and 46b by the rod portions 44a and 44b.

Output chambers 50a and 50b and master cylinder pressure chambers 55a and 55b are formed at both sides of the large-diameter portions 41a and 41b of the piston 38. The output chambers 50a and 50b are always connected to the output ports 10 and 14. The master cylinder pressure chambers 55a and 55b are always connected to the fluid pressure chambers of the tandem master cylinder 1 through connecting ports 52 and 53 and the conduits 3 and 16 are connected to the ports 52 and 53. Small openings are formed in the spring receiving rings 42a and 42b so that the larger-diameter portions 41a and 41b of the piston 38 can easily receive the fluid pressure at the outside surfaces.

According to this embodiment, the surfaces of the larger-diameter portions 41a and 41b of the piston 38 receive fluid pressures from the output chambers 50a and 50b, and the master cylinder pressure chambers 55a and 55b are annular. The annular pressure-receiving surfaces are equal to each other in area. In other words, the diameters of the rod portions 44a and 44b are equal to the diameter of the smaller-diameter portions 45. The valve apparatus 8 is constructed as above described.

In FIG. 1, check valves 19a and 19b are connected in parallel with the electromagnetic valve devices 4a and 4b. They permit brake fluid to flow only in the direction from the wheel cylinder side toward the master cylinder side. Both sides of the valve devices 4a and 4b communicate with each other through throttling holes in the A positions. Accordingly, pressurized fluid is rapidly returned through the check valves 19a and 19b to the master cylinder 1 from the wheel cylinders 7a, 7b, 12a and 12b when the brake is released.

When the brake pedal 2 is released in the B or C-positions of the valve devices 4a and 4b during the skid control, the brake fluid can be returned from the wheel cylinder side to the master cylinder side through the check valves 19a and 19b.

The first and second output ports 10 and 14 of the valve apparatus 8 are connected to the wheel cylinders 12a and 12b of the rear wheels 11a and 11b through the proportioning valves 51a and 51b. The proportioning valves 51a and 51b are of a well-known construction. When the fluid pressure of the input port side becomes larger than a predetermined value, the proportioning valves 51a and 51b transmit the fluid to the output side decreased at a pressure that is proportioned to the input pressure.

Figure 3:
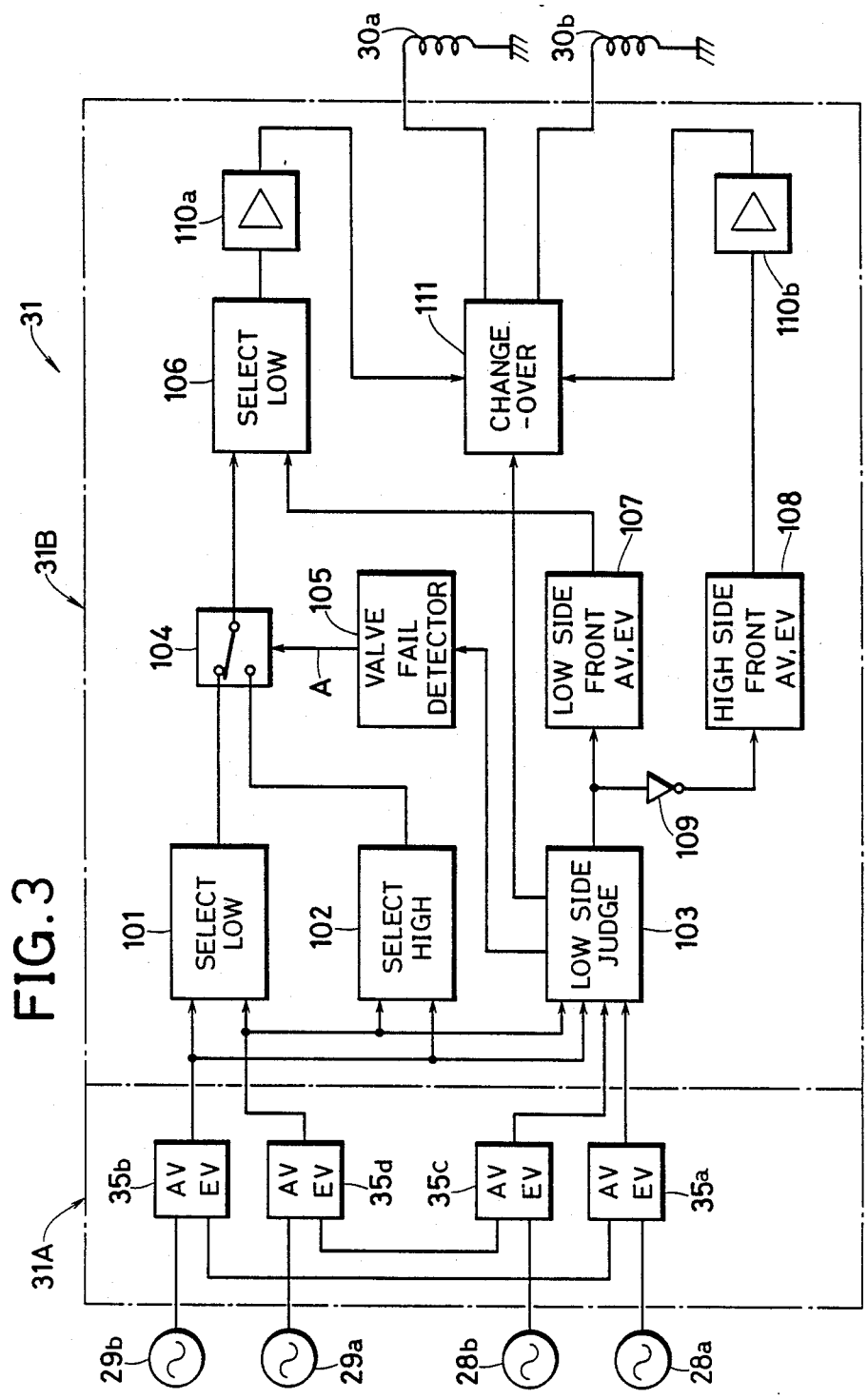
FIG. 3 is a block diagram of the control unit in FIG. 1.

The control unit 31, as shown in FIG. 3, consists of the judge part 31A and the logic 31B. The judge part 31A receives the outputs of the wheel speed sensors 28a, 28b, 29a and 29b and determines the skid conditions of the wheels 6a, 6b, 11a and 11b. Judge circuits 35a, 35c, 35d and 35b for the respective wheels have the same construction. The wheel speeds of the front and rear wheels diagonally opposite each other are used to measure an approximate vehicle speed. Accordingly, the judge circuits 35a and 35b for the front and rear wheels 6a and 11b in the one conduit system are described with reference to FIG. 4. The signals from the wheel speed sensors 28a and 29b are supplied to wheel-speed signal generators 72a and 72b. Digital or analogue outputs proportional to the wheel speeds are obtained from the wheel-speed signal generators 72a and 72b and are supplied to approximate vehicle speed generators 76a and 76b, slip signal generators 77a and 77b, differentiators 73a and 73b.

The approximate vehicle-speed signal generators 76a and 76b receive the outputs of the wheel-speed signal generator 72a and 72b. The outputs of the approximate vehicle-speed signal generators 76a and 76b are equal to the outputs of the wheel-speed signal generators 72a and 72b until the deceleration of the wheel reaches a predetermined value. After it becomes higher than the predetermined value, the outputs of the approximate vehicle-speed signal generators 76a and 76b decrease a predetermined rate with time. The initial outputs are equal to the outputs at the time when the deceleration of the wheel has reached the predetermined value. The outputs of the appropriate vehicle speed signal generators 76a and 76b are supplied to a selecting circuit 71. The higher of the outputs of the approximate vehicle speed generators 76a and 76b is selected by the selecting circuit 71, and it is supplied to the slip signal generators 77a and 77b to be compared with the outputs of the wheel speed signal generators 72a and 72b. A predetermined reference ratio or amount is set in the respective slip signal genertor 77a and 77b. The reference ratio or amount is for example, 0.15 (15%).

Generally, a slip ratio S of the wheel is given by the following formula:

$$S = 1 - (\text{Wheel speed (V)/vehicle speed (E)})$$

When $(1-(V/E))$ is larger than the reference ratio, the output of the slip signal generator 77a becomes a higher level "1" of the two levels "1" and "0".

The differentiator 73a and 73b receive the outputs of the wheel speed signal generators 72a and 72b and differentiate them with respect to time. The outputs of the differentiators 73a and 73b are supplied to deceleration signal generators 75a and 75b and to acceleration signal generators 74a and 74b. A predetermined threshold deceleration (for example, $-1.5$ g) is set in the deceleration signal generators 75a and 75b, and it is compared with the outputs of the differentiators 73a and 73b. A predetermined threshold acceleration (for example, 0.5 g) is set in the acceleration signal generators 74a and 74b, and it is compared with the outputs of the differentiators 73a and 73b. When the deceleration of the wheel becomes larger than the predetermined threshold deceleration ($-1.5$ g), a deceleration signal $\underline{b}$ is generated from the deceleration signal generator 75a or 75b. When the acceleration of the wheel becomes larger than the predetermined threshold acceleration (0.5 g), an acceleration signal $+b$ is generated from the acceleration signal generator 74a or 74b.

Output terminals of the acceleration signal generators 74a and 74b are connected to negation input terminals (indicated by circle o) of AND gates 92a and 82b, negation input terminals of AND gates 90a and 90b, OFF delay timers 88a and 88b and first input terminals of OR gates 94a and 84b. Output terminals of the OFF delay timers 88a and 88b are connected to input terminals of the AND gates 90a and 90b. Output terminals of the AND gates 90a and 90b are connected to input terminals of pulse generators 78a and 78b and to one input terminal of each of AND gates 93a and 93b. Output terminals of the pulse generators 78a and 78b are connected to negation input terminals of the AND gates 93a and 93b. Stepwise brake-increasing signal generators 81a and 81b comprise the acceleration signal generators 74a and 74b, the OFF-delay timers 88a and 88b, the pulse generators 78a and 78b, the OR gates 94a and 94b, and the AND gates 90a, 90b, 93a and 93b. The signal generators 81a and 81b generates pulse signals to increase the brake pressure slowly during the delay time of the OFF delay timers 88a and 88b. The OFF-delay time T is set according to the time when the brake pressure should be slowly increased during the anti-skid control operation, as described hereinafter. Output terminals of the AND gates 93a and 93b are connected to second input terminals of the OR gates 94a and 94b.

Output terminals of the deceleration signal generators 75a and 75b are connected to third input terminals of the OR gates 94a and 94b through OFF-delay timers 96a and 96b and to input terminals of the approximate vehicle speed signal generators 77a and 76b. Output terminals of the slip signal generators 77a and 77b are connected to other input terminals the AND gates 92a and 92b.

Signals EVVR, EVHL and AVVR, AVHL at output terminals of the OR gates 94a and 94b and AND gates 92a and 92b are judge results that are supplied to the following stage, the logic circuit 31B. The levels of the signals EVVR, EVHL are "$\frac{1}{2}$", while those of the signals AVVR, AVHL are "1".

Signals EVVL, EVHR, AVVL and AVHR corresponding to the above described signals EVVR, EVHL, AVVR, AVHL are generated in the other judge circuits 35c and 35d. The signals EVVL and AVVL are the judge results of the skid conditions of the left front wheel 6b. The signals EVHR and AVHR are the judge results of the skid conditions of the right rear wheel 11b. They are also supplied to the following stage, the logic part 31B.

Figure 5:
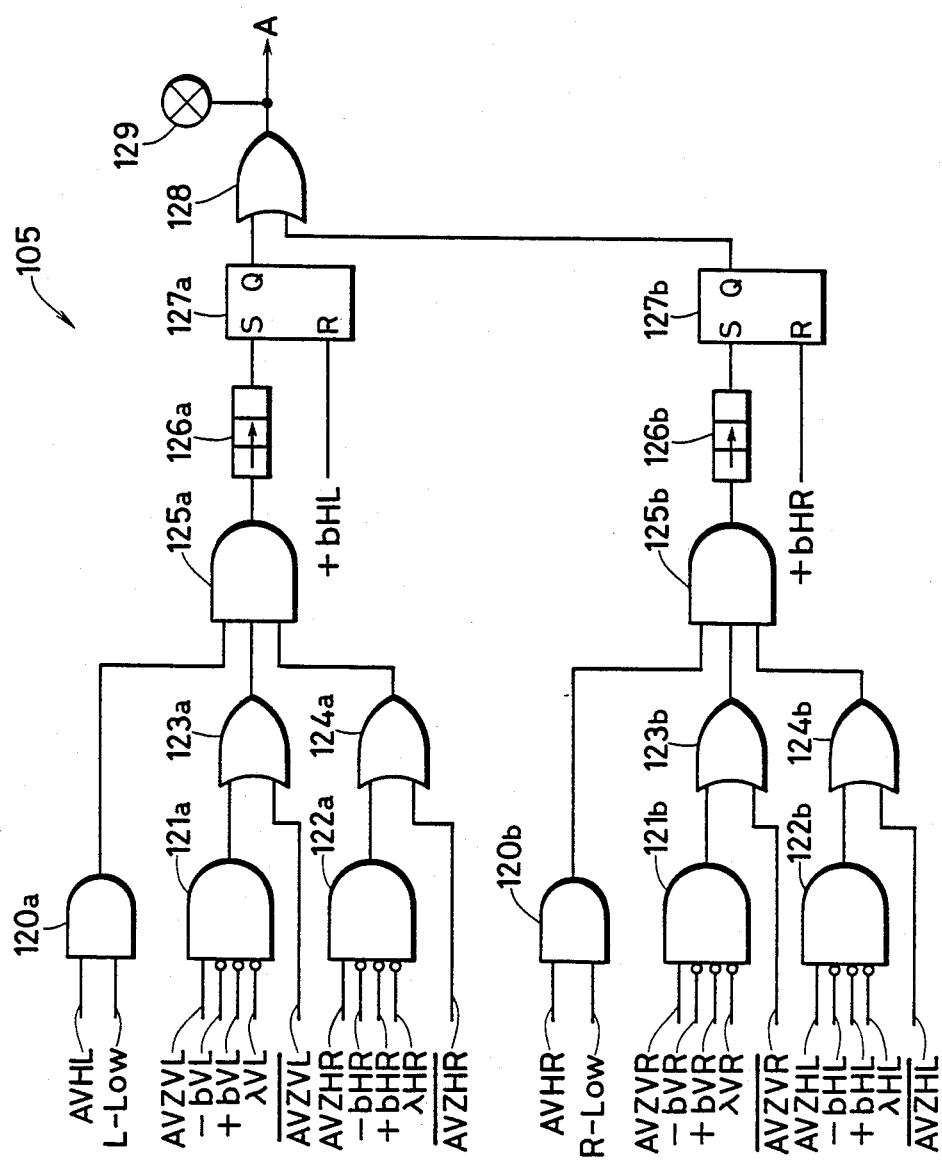
FIG. 5 is a circuit diagram showing the details of the valve fail detector in the logic part of the control unit in FIG. 3.

Consider now the logic part 31B with reference to FIG. 3 and FIG. 5. The judge signals EVHL, EVHR, AVHL and AVHR of the judge part 31A for the rear wheels 11a and 11b are supplied to a select-low logic circuit 101 and to a select-high logic circuit 102. The judge signals are combined logically in the select-low logic circuit 101. When any one of these signals is generated in the judge circuit 31A, that signal is taken as an output from the select-low circuit 101. The judge signals are combined logically in the select-high logic circuit 102. When both of the signals EVHL and EVHR are generated, either of them is taken as an output from the circuit 102. When both of the signals AVHL and AVHR are generated, either of them is put out from the circuit 102.

The judge signals of the judge circuits 35a, 35b, 35c and 35d are supplied to a low-side judge circuit 103. The low-side judge circuit 103 judges which side is a frictionally low side on the road on which the vehicle, is running, based on these signals. Thus, it is judged which side has a lower frictional coefficient, the right side or left side of the road.

Figure 4:
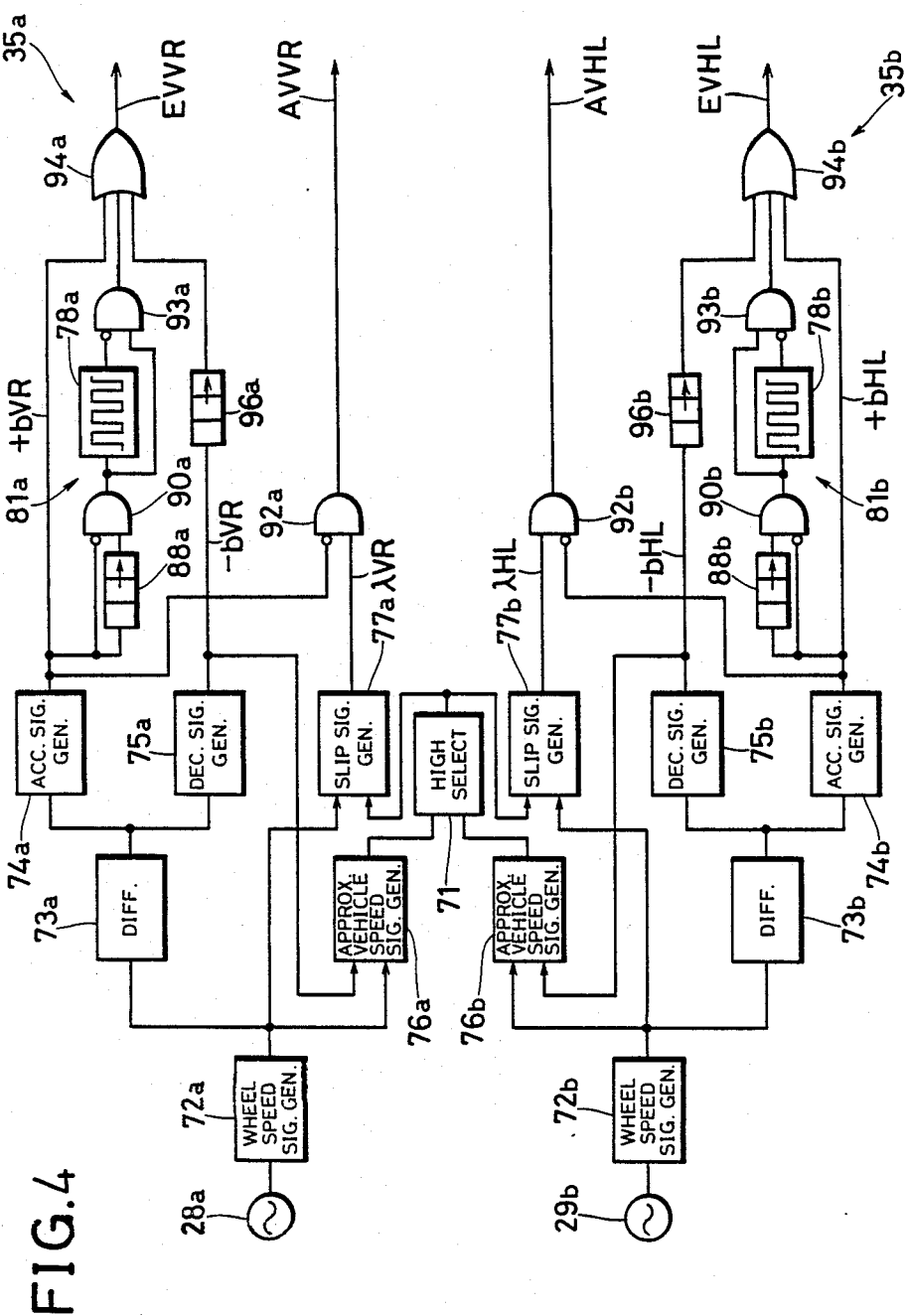
FIG. 4 is a circuit diagram showing the details of the judge part of the control unit in FIG. 3.

The output terminals of the select-low logic circuit 101 and select-high logic circuit 102 are connected to a change-over circuit 104. On the other hand, an output terminal of a valve apparatus fail detecting circuit 105 is connected to the change-over circuit 104. The details of the circuit 105 are shown in FIG. 4. When the valve apparatus fail detecting circuit 105 detects a failure, the movable contact is changed over to the lower side from the position shown. Accordingly, the output of the select-low logic circuit 101 is normally supplied to the following stage, a select-low logic circuit 106. In case of failure of the valve apparatus 8, the output of the select-high logic circuit 102 is supplied to the select-low logic circuit 106.

The low-side judging circuit 103 judges which side of the road has a lower coefficient of friction. Based on this result, the output identifying a the front wheel 6a or 6b that is on the low side is supplied to a low-side front wheel output circuit 107 and the output identifying the other front wheel 6b or 6a on the high-side is supplied to a high side front wheel output circuit 108. An inverter 109 represents this selection in FIG. 3.

An output of the low-side front wheel output circuit 107 is connected to the select-low logic circuit 106. The outputs EVVL, AVVL or EVVR, AVVR of the low-side front wheel are supplied to the select-low logic circuit 106. The output of the select-low logic circuit 101 or of the select-high logic circuit 102 and the output of the low-side front wheel output circuit 107 are logically combined with each other in the select-low logic circuit 106. When any one of these outputs occurs, it is taken as an output from the circuit 106.

The output of the select-low logic circuit 106 is amplified by an amplifier 110a. Similarly, the output of the high-side front wheel output circuit 108 is amplified by an amplifier 110b. The outputs of the amplifiers 110a and 110b are supplied to the solenoid portion 30a or 30b of the change-over valves 4a and 4b through a change-over circuit 111 in accordance with the output of the low-side judge circuit 103. For example, when the right side is the low-friction side, the output of the amplifier 110a is supplied to the solenoid portion 30a, while the output of the other amplifier 110b is supplied to the solenoide portion 30b.

Figure 6:
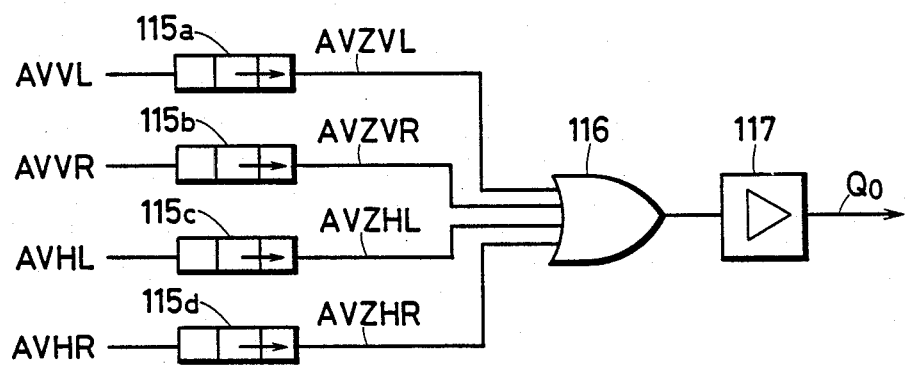
FIG. 6 is a circuit diagram of the motor drive circuit in the logic part of the control unit.

The logic part 31B further includes, although it is not shown in FIG. 3, a motor drive circuit as shown in FIG. 6. The motor drive consists of OFF delay timers 115a, 115b, 115c and 115d, an OR gate 116 which receives the outputs thereof and an amplifier 117. The above-described outputs AVVL, AVVR, AVHL and AVHR are supplied to the OFF delay timers 115a, 115b, 115c and 115d. The outputs AVZVL, AVZVR, AVZHL and AVZHR of the timers 115a, 115b, 115c and 115d become "1" as soon as their inputs become "1". The outputs of the timers 115a, 115b, 115c and 115d are maintained at "1" for the delay time after the inputs become "0". The off-delay time is set so sufficiently long to maintain the level "1" during the anti-skid control operation. The output of the OR gate 116 is amplified by the amplifier 117. The amplified output of the amplifier 117 is the above-described motor drive signal Qo.

Next, the valve apparatus tail detecting circuit 105 will be described with reference to FIG. 5.

The circuit 105 is symmetrical with respect to the conduit systems. The judge outputs AVHL AVHR of the rear wheels are each supplied to one input terminal of AND gates 120a and 120b. Detecting outputs L-Low and R-Low of the low-side judge circuit 103 are each supplied to another input terminals of the AND gates 120a and 120b respectively. The output L-Low become "1" when the left side of the road is the low side. The output R-low become "1" when the right side of the road is the low side. The outputs AVZL and AVZVR of the OFF delay timers 115a and 115b, shown in FIG. 6, are supplied to the first input terminals of the second AND gates 121a and 121b. The deceleration signals −bVL and −bVR of the deceleration signal generator 75a in the judge part 31A are negated and supplied to the second input terminals thereof. The acceleration signals +bVL and +bVR of the acceleration signal generator 74a in the judge part 31A are negated and supplied to the third input terminals thereof. The slip signals λVL and λVR of the slip signal generator 77a in the judge part 31A are negated and supplied to the fourth input terminals thereof. The output terminals of the first AND gates 120a and 120b are connected to first input terminals of fourth AND gates 125a and 125b. The output terminals of the second AND gates 121a and 121b are each connected to one input terminal of first OR gates 123a and 123b. The signals $\overline{AVZVL}$ and $\overline{AVZVR}$ or negation signals of AZVL and AVZVR are supplied to other input terminals of the first OR gates 123a and 123b. The outputs of the first OR gates 123a and 123b are supplied to second input terminals of the fourth AND gates 125a and 125b. The outputs AVZHR and AVZHL of the OFF delay timers 115d and 115c, shown in FIG. 6, are supplied to first input terminals of third AND gates 122a and 122b. The deceleration signals −bHR and −bHL of the deceleration signal generators in the judge part 31A are negated and supplied to second input terminals thereof. The accleration signals +bHR and +bHL of the acceleration signal generators in the judge part 31A are negated and supplied to third input terminals thereof. The slip signals λHR and λHL of the slip signal generators in the judge part 31A are negated and supplied to fourth input terminals thereof. The outputs of the third AND gates 122a and 122b are each supplied to one input terminal of second OR gates 124a and 124b. Signals $\overline{AVZHR}$ and $\overline{AVZHL}$ which are negations of the above described signals AVZHR and AVZHL, are supplied to other input terminals thereof. The output signals of the second OR gates 124a and 124b are supplied to third input terminals of the above described fourth AND gates 125a and 125b.

The output terminals of the fourth AND gates 125a and 125b are connected to set terminals S of flip-flops 127a and 127b through ON delay timers 126a and 126b. Q output terminals of the flip-flops 127a and 127b are connected to input terminals of a third OR gate 128. The acceleration signals +bHL and +bHR of the acceleration signal generators in the judge part 31A are supplied to reset terminals R of the flip-flops 127a and 127b. The output A of the third OR gate 128 is the detecting signal representing that the valve apparatus 8 has failed. This signal is supplied to the change-over circuit 104 shown in FIG. 3. A tail lamp 129 is connected to the output terminal of the third OR gate 126. When it is detected that the valve apparatus 8 has failed, the lamp 129 is turned on. The valve apparatus fail detecting circuit 105 is so constructed as above described.

The outputs of the first AND gates 120a and 120b are the signals representing the fact that the rear wheel on the low side is in the skid condition to relieve the brake. The outputs of the second AND gates 121a and 121b are the signals the representing the fact that the front wheel on the low side is rotating in the stable region of the μ-slip characteristics.

The outputs of the third AND gates 122a and 122b are the signals representing the fact that the rear wheel on the high side is rotating in the stable region.

In this embodiment, it is considered that the corresponding wheels are rotating in the stable region when the signals AVZVL, AVZVR, AVZHR and AVZHL are not generated.

The definition of "the stable region of the μ-slip characteristics" is described, for example, in the "these of automobile technology society" 133 page, No. 31, 1985. The "stable region" means that the wheel is rotating at smaller slip rates than the slip rate at the maximum of μ-value (frictional value) in the slip rate-frictional coefficient μ characteristics. If none of the slip signal, first acceleration signal $+b_1$, or deceleration signal $-b$, occurs if the anti-skid control is not started, and if the output AVZVL etc. is not generated, operation is in the "stable region".

In other words, when the rear wheel on the low side locks, and both the one front wheel on the same side and the other rear wheel on the high side are rotating in the stable region, it is considered that the valve apparatus 8 has failed. The ON delay timers 126a and 126b are not always required. However, the failure of the valve apparatus 8 can be more certainly detected by the arrangements of the ON delay timers 126a, 126b.

Next, there will be described operations of the above described anti-skid apparatus.

It is now assumed that both of the conduit systems are in order, and the wheels 6a, 6b, 11a and 11b run on a road which is uniform in frictional coefficient. Suppose the vehicle driver depresses the brake pedal 2. At the beginning of the braking, the control signals Sa and Sb are "0" from the control unit 31. Accordingly, the valve devices 4a and 4b are in the A-position. Pressurized fluid is supplied from the master cylinder 1 to the wheel cylinders 7a and 7b of the front wheels 6a and 6b through the conduits 3 and 16, the valves devices 4a and 4b and the conduits 5 and 17. Also, pressurized fluid is supplied to the wheel cylinders 12a and 12b of the rear wheels 11a and 11b through the first and second input ports 9 and 18, the input chambers 49a and 49b, the output chambers 50a and 50b, the first and second output ports 10 and 14 in the valve apparatus 8, the conduits 13 and 15 and the proportioning valves 51a and 51b. Thus, the wheels 6a, 6b, 11a and 11b are braked.

The fluid pressures of the fluid pressure generating chambers of the master cylinder 1 rise at substantially the same rate. Accordingly, the pressures of the master cylinder pressure chambers 55a and 55b are substantially equal to each other in the valve apparatus 8. Further, the pressures of the output chambers 50a and 50b, and therefore the input chambers 49a and 49b, when the valve balls 47a and 47b are separated from the valve seats 46a and 46b, are substantially equal to each other. Accordingly, the piston 38 is not moved, and remains positioned at the neutral position shown.

When the deceleration or slip ratio of the wheels 6a, 6b, 11a and 11b becomes higher than the predetermined deceleration or slip ratio with the increase of the brake fluid pressure, the control signals Sa and Sb are at level "1" or "½".

The operation of the control unit 31 according this invention will be described hereinafter. First the operations of the valve apparatus 8 when the level of the control signals Sa and Sb are "1" and "½", are described. The control signals Sa and SB become "1" at the same time. The solenoid portions 30a and 30b are energized. The valves 4a and 4b take the third position C. The conduits 3b and 16a are disconnected from the conduits 5 and 17, respectively. However, the conduits 5 and 17 are connected to the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15 and 13, the output ports 14 and 10, the output chambers 50b and 50a, the input chambers 49b and 49a, the input ports 18 and 9 in the valve apparatus 8, and the conduits 17a, 5a, 60b and 60a, into the hydraulic reservoirs 25a and 25b. Thus, the brakes of the wheels 6a, 6b, 11a and 11b are relieved.

The brake fluid is drawn from the reservoirs 25a and 25b and supplied towards the conduits 3a and 16a, at nearly the same rate by the fluid pressure pumps 20a and 20b. Accordingly, the fluid pressures of the output chambers 50a and 50b at both sides of the piston 38 are decreased at nearly the same rate. The piston 38 remains stopped at the neutral position, and the valve balls 47a and 47b remain separated from the valve seats 46a and 46b.

According to the control unit 31 of this embodiment, when the deceleration of the wheels 6a and 6b becomes lower than the predetermined deceleration, the control signals Sa and Sb take the middle level "½". The valves 4a and 4b take the second position B. The conduits 3b and 16a are disconnected from the conduits 5 and 17 and the conduits 5 and 17 are disconnected from the conduits 60a and 60b. Thus the brake fluid pressures of the wheel cylinders 7a, 7b, 12a and 12b are maintained constant. The fluid pressure pumps 20a and 20b continue to supply brake fluid to the conduits 3 and 16.

When the skid conditions of the wheels 6a, 6b, 11a and 11b are removed, the control signals Sa and Sb again become low level "0". The valves 4a and 4b take the position A. The master cylinder side is connect to the wheel cylinder side. The braking forces to the wheels 6a, 6b, 11a and 11b again increase.

Hereafter, the above-described operations are repeated. When the running speed of the vehicle reaches the desired speed, or when the vehicle stops, the brake pedal 2 is released. The brake fluid is returned from the wheel cylinders 7a, 7b, 12a and 12b to the master cylinder 1 through the conduits, the valve apparatus 8, the valve devices 4a and 4b, and the check valves 19a and 19b.

In the above description, the control signals Sa and Sb become "0", "1" or "½" at the same time. However, when the frictional coefficients of the road are considerably different between the right and left sides, the control signals Sa and Sb do not become "0", "1", or "½" at the same time. For example, when the frictional coefficient of the right side of the road is relatively small, the control signal Sa first becomes "1". This case will now be described.

The operations as the beginning of the braking are the same as described above. When the control signal Sa becomes "1", the valve 4a takes the position C. Pressurized fluid is discharged into the reservoir 25a from the wheel cylinders 7a and 12b.

In the valve apparatus 8, the fluid pressure is decreased in the input and output chambers 49a and 50a at the left side of the piston 38. On the other hand, the brake fluid continues to be supplied to the wheel cylinders 7b and 12a from the master cylinder 1. Accordingly, the force pushing the piston 38 to the left becomes larger. The piston 38 is moved to the left. Thus, the right valve ball 47b comes to seat the valve seat 46b by spring action of the spring 48b. On the other hand, the left valve ball 47a is separated further from the valve seat 46a by the rod portion 44a. The left input chamber 49a remains connect to the left output chamber 50a, while the right input chamber 49b is disconnected from the right output chamber 50a. Thus, the fluid supply to the wheel cylinder 12a of the one rear wheel 11a from the master cylinder is interrupted.

When the piston 38 is moved further to the left with the decrease of the fluid pressure of the left input and output chambers 49a and 50a, the volume of the right output chamber 50b is increased. In other words, the fluid pressure of the wheel cylinder 12a of the rear wheel 11a is lowered since the wheel cylinder 12a communicates with the right output chamber 50b through the output port 14 and the conduit 15.

When the control signal Sa becomes again "0" to increase the fluid pressure of the input and output chambers 49a and 50a, the piston 38 is moved to the right to decrease the volume of the right output chamber 50b, while the right valve ball 47b seats on the valve seat 46b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 6a is controlled in accordance with the brake fluid pressure of the wheel cylinder 7a of the front wheel 6a. Thus, the rear wheel 11a running on the lower frictional coefficient side of the road is prevented from locking, similarly to the front wheel 6a at the same side. If the brake fluid pressure of the wheel cylinder 12a of the rear wheel 11a is controlled in common with the brake fluid pressure of the wheel cylinder 7b of the front wheel 6b running on the higher frictional coefficient side, the rear wheel 11a would be locked.

The fluid pressures of the wheel cylinders 7a and 12b of the front wheel 6a and the rear wheel 11b are maintained constant, when the control signal Sa becomes "1". The fluid pressure of the other front wheel 6b continues to increase, since the other control signal Sb is still "0". Accordingly, the piston 38 is moved to be left, since the fluid pressure of the input chamber 49b becomes higher than that of the input chamber 49a. Accordingly, the valve ball 47b seats on the valve seat 46b.

After this, the fluid pressure of the output chamber 50b does not increase and is maintained constant. Thus, the fluid pressure of the wheel cylinder 12a of the right rear wheel 11a becomes a little higher than that of the left rear wheel 11b and then remains constant.

Next, we consider the case where one of the two conduit systems fails. For example, when brake fluid leads from the one conduit system including the conduit 3, the fluid pressures of the wheel cylinders 7a and 12b do not increase when the brake pedal 2 is depressed. On the other hand, the fluid pressure of the other conduit system including the conduit 16 increases when the brake pedal 2 is depressed. Accordingly, in the valve apparatus 8, the fluid pressure of the one master cylinder pressure chamber 55b rises, while that of the other master cylinder pressure chamber 55a remains zero. Thus, the fluid pressures to both sides of the one larger-diameter portion 41a of the piston 38 are zero. Those to both sides of the other larger-diameter portion 41b of the piston 38 are not zero, but are substantially equal to each other. As a result, the piston 38 is not moved, and remains located at the neutral position shown. Accordingly, the valve ball 47b remains separated from the vave seat 46b.

Thus, in the right conduit system, the pressurized fluid is supplied from the master cylinder 1 into the wheel cylinder 7b of the left front wheel 6b through the conduits 16 and 16a, the valve 4b and the conduit 17. Further, it is supplied from the master cylinder 1 to the wheel cylinder 12a of the right rear wheel 11a through the conduit 17a, the input chamber 49b of the valve apparatus 8, the output chamber 50b thereof (the valve ball 47b opened), and the conduit 15. Thus, the braking force can be obtained with certainty in the one-conduit system.

When the valve 4b is changed to the position B or C, tending to lock the locking of the front or rear wheel 6b or 11a, the fluid pressure of the input and output chambers 49b and 50b becomes lower than that of the master cylinder pressure chamber 55b in the valve apparatus 8, and so the piston 38 is moved to the right, this causes fluid pressure difference between both sides of the larger diameter portion 41b. Accordingly, the valve ball 47b is moved further to the right and separated more from the valve seat 46b. The valve ball 47b remains separated.

Whenever the valve 4b is changed over into the position B, the wheel cylinders 7b and 12a of the wheels 6b and 11a are disconnected from both the master cylinder and the reservoir 25b, so that the fluid pressure of the wheel cylinders 7b and 12a increases with the rightward movement of the piston 38, since the volume of the input and output chambers 49b and 50b decreases.

When the valve 4b is changed to the position C, the wheel cylinders 7b and 12a of the wheels 6b and 11a are disconnected from the master cylinder side, but are connected to the reservoir side. Thus, the braking forces of the front and rear wheels 6b and 11a are decreased, so that the wheels are prevented from locking.

As above described, the braking force can be securely obtained properly in the one right conduit system, even when the other conduit system fails. The special sleeve and position are not required for opening the valve ball in the one right conduit system, as in the prior art. Accordingly, the fluid amount for moving the special sleeve and piston is not needed, and the stroke of the brake pedal 2 does not become excessive.

Next, there will be described operations of the control unit according to this invention. It is assumed that the right side is low side.

In FIG. 3, the judge output of the right front wheel 6a is supplied to the select low logic circuit 106 with the detecting output of the low-side judge circuit 103. On the other hand, the judge output of the left front wheel 6b is supplied to the high-side front wheel output circuit 108 and it is amplified by the amplifier 110b. It is further supplied to the solenoid portion 30b of the change-over valve 4b through the change-over circuit 111. Thus the front wheel 6b on the high side is independently controlled.

With respect to the front wheel 6a on the low side, both of the rear wheels 11a and 11b do not yet generate the output signals AVHL and AVHR. Accordingly in FIG. 5, the outputs of the AND gates 125a and 125b are "0". And the Q outputs of the flip-flops 127a and 127b are "0". Thus in FIG. 3, the change-over circuit 104 selects the outputs of the select low logic circuit 101 and supplies them to the select low logic circuit 106. The judge result of the front wheel 6a on the low side and the judge results of the rear wheels 11a, 11b are logically combined with each other. The select low output of the select low logic circuit 106 is amplified and it is supplied to the solenoid portion 30a of the change-over valve 4a through the change-over circuit 111.

When the valve apparatus 8 is in order, the same operations as above described are effected. However, suppose now that the piston 38 remains stopped at the neutral position in the valve apparatus 8, when it should be moved rightwards or leftwards.

The judge result AVHR for relieving the brake is generated fro the rear wheel 11a on the low side. The output of the AND gate 120b becomes '1" in FIG. 5. Then the solenoid portion 30a of the change-over valve 4a is energized and so the brake of the front wheel 6a on the low side is relieved. If the valve apparatus 8 is in order, also the brake of the rear wheel 11a on the low side is relieved as above described. However since the valve apparatus is now out of order, the diagonal connection between the front wheel 6a and the rear wheel 11b is maintained. Although the braking of the rear wheel 11b on the high side is relieved, the rear wheel 11a on the low side remains locked. Accordingly, the front wheel 6a and the rear wheel 11b on the high side are subject to remarkable under braking.

In FIG. 5, the outputs of the AND gates 121b and 122b become "1" and the Q output of the flip-flop 127b become '1". Accordingly, the output of the OR gate 128 becomes "1" and the lamp 129 is lit. Thus, the driver is informed of the failure of the valve apparatus 8.

Figure 7B:
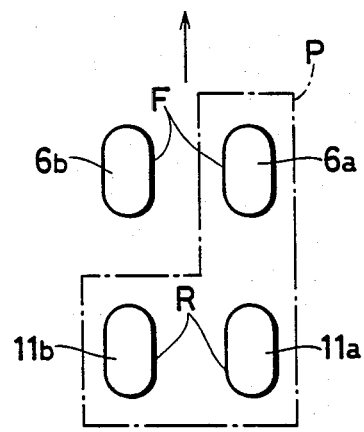
FIG. 7A and FIG. 7B are charts showing operations of the embodiment of this invention.
Figure 7A:
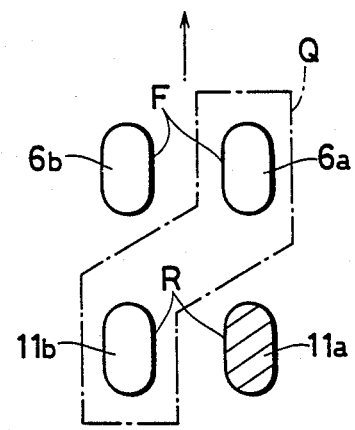

On the other hand, the output of the OR gate 128 is supplied to the change-over circuit 104. The switch is changed over and so the output of the select high logic circuit 102 is selected and it is supplied to the select low logic circuit 106. Accordingly, the judge result formed by the select high logic of the outputs of the rear wheels 11a and 11b and the judge result of the right front wheel 6a on the low side are combined logically with each other. Thus, the elect low control between them is effected. That fact is shown in FIG. 7A. The arrow in FIG. 7A represents the direction that the vehicle is moving. The right rear wheel 11a on the low side now locks. Only this wheel is hatched. As shown by the broken line Q, the select low control is effected between the judge output of the right front wheel 6a and that of the left rear wheel 11b.

Since the right rear wheel 11a locks, the select low control between the select high output of the rear wheels 11a and 11b and the judge output of the right front wheel 6a is equal to the select low control between the judge output of the left rear wheel 11b and that of the right front wheel 6a. On other hand, the control in the case when the valve apparatus 8 is in order is shown by the broken line P in FIG. 7B. Thus, the select low judge output of the rear wheels 11a, 11b and the judge output of the right front wheel 6a on the low side are subject to select low control.

As described above, when the valve apparatus 8 fails, even though the right rear wheel 11a locks, the brake of the front wheel 6a on the low side does not continue to be relieved. Accordingly, the brake of the left rear wheel 11b on it high side is not relieved, but the braking force is increased. Thus, the underbraking as in the prior art is avoided. When the right front wheel 6a tends to lock, the solenoid portion 30a of the change-over valve 4a is energized. The brake of the front wheel 6a and the rear wheel 11b of the same conduit system are relieved. Thus, backing of the right front wheel 6a is avoided. The front wheel 6b on the high side is independently controlled. Now, when this front wheel 6b tends to lock, the solenoid portion 30b of the change-over valve 4b is energized and braking of the front wheel 6b is relieved.

In addition braking of the right rear wheel 11a of the same conduit system is relieved, since the valve apparatus 8 has failed. The right rear wheel 11a is accelerated by this effect. In FIG. 4, when the acceleration signal +bHR from the acceleration signal generator 74a (representatively designated) is generated, the reset input is supplied to the reset terminal R of the flip-flop 127b in FIG. 5. Accordingly, the Q output thereof becomes "0" and so the fail lamp 129 extinguished. In FIG. 3, the switch of the change-over circuit 104 is again changed over and the output of the select low logic circuit 101 is again selected and supplied to the next stage or the select low logic circuit 106. However, as long as failure of the valve apparatus 8 is not eliminated, the operations described above are repeated because of the tendency of the rear wheel 11a on the low side to lock.

While the preferred embodiment has been described, variations thereto will occur to those skilled in the art within the scope of the present inventive concepts which are delineated by the following claims.

For example, in the above embodiment, the output AVVL and the OFF delay signal AVZVL of the signal AVVL, the slip signal λ, the deceleration signal −b, etc., are used for detecting failure of the valve apparatus 8 as shown in FIG. 5. Instead, the other judge results may be used.

In addition, in the above embodiment, the signals AVHL, AVHR and the signal L-Low and R-Low are supplied to the AND gates 120a and 120b. In contrast, a device may be used that generates an output signal when the wheel speed of the left rear wheel or the right rear wheel becomes lower than a predetermined extremely-low speed such as 3km/h (including 0 km/h). For example, a comparator may be used and a reference speed such as 3 km/h maybe supplied to a reference input terminal thereof while the wheel speed signal of the left rear wheel or right rear wheel is supplied to the comparison input terminal.

In the alternative to detect failure of the valve apparatus, the detecting output of means for detecting movement or one member of members of the valve apparatus 8 such as piston 45 may be combined with one or more of the judge results.

The valve apparatus 8 is not limited to the valve apparatus shown, but other well known valves may be used as a pressure selecting means for this invention. For example, any of the valve apparatus disclosed in the previous U.S.A. application Ser. No. 907596 of this applicant may be used in this application. The piston in the valve apparatus may consist of plural piston members.

Further, in the above embodiment, the select low logic circuits 101, 106 and select high logic circuit 102 are not shown in detail. For example, logic circuits described in the Japanese patent application No. 77380/1985 and U.S. Ser. No. 57802 previously proposed by the same applicant may be used for this invention.

In the above embodiment, the lamp 129 is used for informing the driver of the failure of the valve apparatus. Instead, a buzzer may be used.

What is claimed is:

1. In an anti-skid control apparatus for a vehicle braking system including:

(A) a pair of front wheels, and a pair of rear wheels;

(B) wheel speed sensors associated with said wheels, respectively;

(C) a first fluid pressure control valve device for controlling the brake fluid pressure of the wheel cylinder of one of said front wheels, arranged between a first fluid pressure generating chamber of a tandem master cylinder and said wheel cylinder of the one front wheel;

(D) a second fluid pressure control valve device for controlling the brake fluid pressure of the wheel cylinder of another of said front wheels, arranged between a second fluid pressure generating chamber of said tandem master cylinder and said wheel cylinder of the other front wheel;

(E) a control unit receiving outputs of said wheel speed sensors for measuring or judging the skid conditions of said front and rear wheels and for generating instructions for controlling said first and second fluid pressure control valve devices; and (F) a valve apparatus for generating a fluid pressure in accordance with the lower one of the brake fluid pressure of said front wheels controlled with said first and second fluid pressure control valve devices, being arranged between said wheel cylinders of the front wheels and those of the rear wheels, wherein said control unit discriminates the frictionally lower one (designated as "low side") of the sides of the road on which said wheels are running, on the basis of the measuring results of the skid conditions of said rear wheels and front wheels, normally combines logically the measuring results of the skid conditions of said rear wheels with the measuring result of the skid conditions of the one front wheel running on the low side for generating an instruction for controlling the one of said first and second fluid pressure control valve devices for said one front wheel running on the low side and generates the instruction for controlling the other of said first and second fluid pressure control valve devices, for the other front wheel running on the high side (frictionally higher side) on the basis of the measuring result of the skid condition of said other front wheel on the high side independently of those of said rear wheels, the improvements in which there are provided fail-detecting means for detecting failure of said valve apparatus, and changeover means for changing over the one control to combine logically the measuring results of the skid conditions of said rear wheels with the measuring result of the skid condition of the one front wheel running on the low side into the other control to combine logically the measuring result of the skid condition of the one rear wheel running on the high side with the measuring result of the skid condition of said one front wheel running on the low side, for generating the instruction for controlling said one of the first and second fluid pressure control valve devices for said one front wheel, when said failure detecting means detects fail of said valve apparatus.

2. An anti-skid control apparatus according to claim 1, in which said fail-detecting means detects the failure of said valve apparatus from the fact that both of the one front wheel on the low side and the one rear wheel on the high side are detected as rotating in the stable region of the slip characteristics when the other rear wheel on the low side locks or tends to lock.

3. An anti-skid control apparatus according to claim 1, in which warning means is provided for warning the driver of said vehicle of the fail of said valve apparatus.

4. An anti-skid control apparatus according to claim 2 in which said fail-detecting means includes means for restoring through said changeover means said other control to combine logically the measuring result of the skid condition of said one rear wheel running on the high side with the measuring result of the skid condition of said one front wheel running on the low side, said one control combining logically the measuring results of the skid conditions of said rear wheels with the measuring result of the skid condition of the one front wheel running on the low side, for generating an instruction for controlling said one of the first and second fluid pressure control valve devices for said one front wheel.

* * * * *